US008690028B2

(12) United States Patent  (10) Patent No.: US 8,690,028 B2
Risheq  (45) Date of Patent: Apr. 8, 2014

(54) PORTABLE WATER CONTAINER WITH PUMP AND FILTER

(75) Inventor: Tareq Risheq, Laguna Niguel, CA (US)

(73) Assignee: SimpliPure, Inc., Aliso Viejo, CA (US)

( * ) Notice: Subject to any disclaimer, the term of this patent is extended or adjusted under 35 U.S.C. 154(b) by 0 days.

(21) Appl. No.: 13/291,763

(22) Filed: Nov. 8, 2011

(65) Prior Publication Data

US 2012/0152380 A1  Jun. 21, 2012

Related U.S. Application Data

(60) Provisional application No. 61/411,302, filed on Nov. 8, 2010, provisional application No. 61/447,336, filed on Feb. 28, 2011.

(51) Int. Cl.
*B60P 3/22* (2006.01)

(52) U.S. Cl.
USPC ...... 222/608; 222/158; 222/175; 222/189.06; 222/189.11; 222/401; 222/469

(58) Field of Classification Search
USPC ............... 222/175, 608, 189.06, 189.11, 382, 222/323, 158, 469, 472–474, 401, 385, 505
See application file for complete search history.

(56) References Cited

U.S. PATENT DOCUMENTS

| | | | | |
|---|---|---|---|---|
| 3,142,443 A * | 7/1964 | Morgan | ............................ | 239/24 |
| 5,154,317 A | 10/1992 | Roppolo, III | | |
| 5,366,642 A | 11/1994 | Platter et al. | | |
| 5,484,538 A | 1/1996 | Woodward | | |
| 5,494,191 A * | 2/1996 | Benson | ............................ | 222/23 |
| 5,534,145 A * | 7/1996 | Platter et al. | ..................... | 210/90 |
| 5,569,374 A | 10/1996 | Williams | | |
| 5,638,991 A | 6/1997 | Todden et al. | | |
| 5,809,934 A | 9/1998 | Gavet | | |
| 5,878,925 A * | 3/1999 | Denkins et al. | ................ | 222/608 |
| 6,047,866 A * | 4/2000 | Brown | ........................... | 222/608 |
| 6,145,711 A * | 11/2000 | Prosper et al. | ................ | 222/401 |
| 6,569,329 B1 * | 5/2003 | Nohren, Jr. | .................... | 210/282 |
| 7,168,599 B1 * | 1/2007 | Criswell et al. | ................ | 222/608 |
| 8,245,889 B1 * | 8/2012 | Starns | ........................... | 222/399 |
| 2006/0144955 A1 | 7/2006 | Farnsworth et al. | | |

(Continued)

FOREIGN PATENT DOCUMENTS

| | | |
|---|---|---|
| CN | 200954418 | 10/2007 |
| CN | 201358201 | 12/2009 |

(Continued)

OTHER PUBLICATIONS

"KRS-2150 Nostalgia Electrics Stainless Kegerator & Beer Dispenser", Ait & Water, Inc., http://www.air-n-water.com/product/krs-2150.htm., Feb. 17, 2011.

(Continued)

*Primary Examiner* — Frederick C Nicolas
(74) *Attorney, Agent, or Firm* — Fish & Tsang LLP

(57) ABSTRACT

A portable filter container for manually transporting large quantities of a liquid is described. The container includes an extendible handle that allows for easy transportation of the container on a set of wheels. The handle also actuates a pump to provide pressure to the inside of the container in order to force the liquid through a filter. The handle can actuate the pump either using a piston or a lever motion.

17 Claims, 2 Drawing Sheets

(56) References Cited

U.S. PATENT DOCUMENTS

| | | | |
|---|---|---|---|
| 2007/0131714 A1* | 6/2007 | Jutras et al. | 222/135 |
| 2009/0173673 A1 | 7/2009 | Pritchard | |
| 2009/0277535 A1 | 11/2009 | Wang et al. | |
| 2010/0116847 A1* | 5/2010 | Foroughi et al. | 222/81 |
| 2010/0187183 A1 | 7/2010 | Nelson et al. | |
| 2011/0163116 A1* | 7/2011 | Dixon | 222/1 |

FOREIGN PATENT DOCUMENTS

| | | |
|---|---|---|
| GB | 2440137 | 1/2008 |
| GB | 2473256 | 3/2011 |
| KR | 101015108 | 2/2011 |
| WO | 97/01490 | 1/1997 |
| WO | 2010/091920 | 8/2010 |
| WO | 2011/027125 | 3/2011 |

OTHER PUBLICATIONS

"Gambro Portable Hand Sink Cart, Self-Contained, Navy Blue, KCS402-186", DEI Design, http://www.deiequipment.com/s.nl/it.A/id.4620/.f, Feb. 17, 2011.

"Reliance Hydroller Wheeled Water Container—8 Gallon", Vermont's Barre, http://www.vtarmynavy.com/reliance-hydroller-wheeled-water-container--8-gallon.htm., Feb 17, 2011.

* cited by examiner

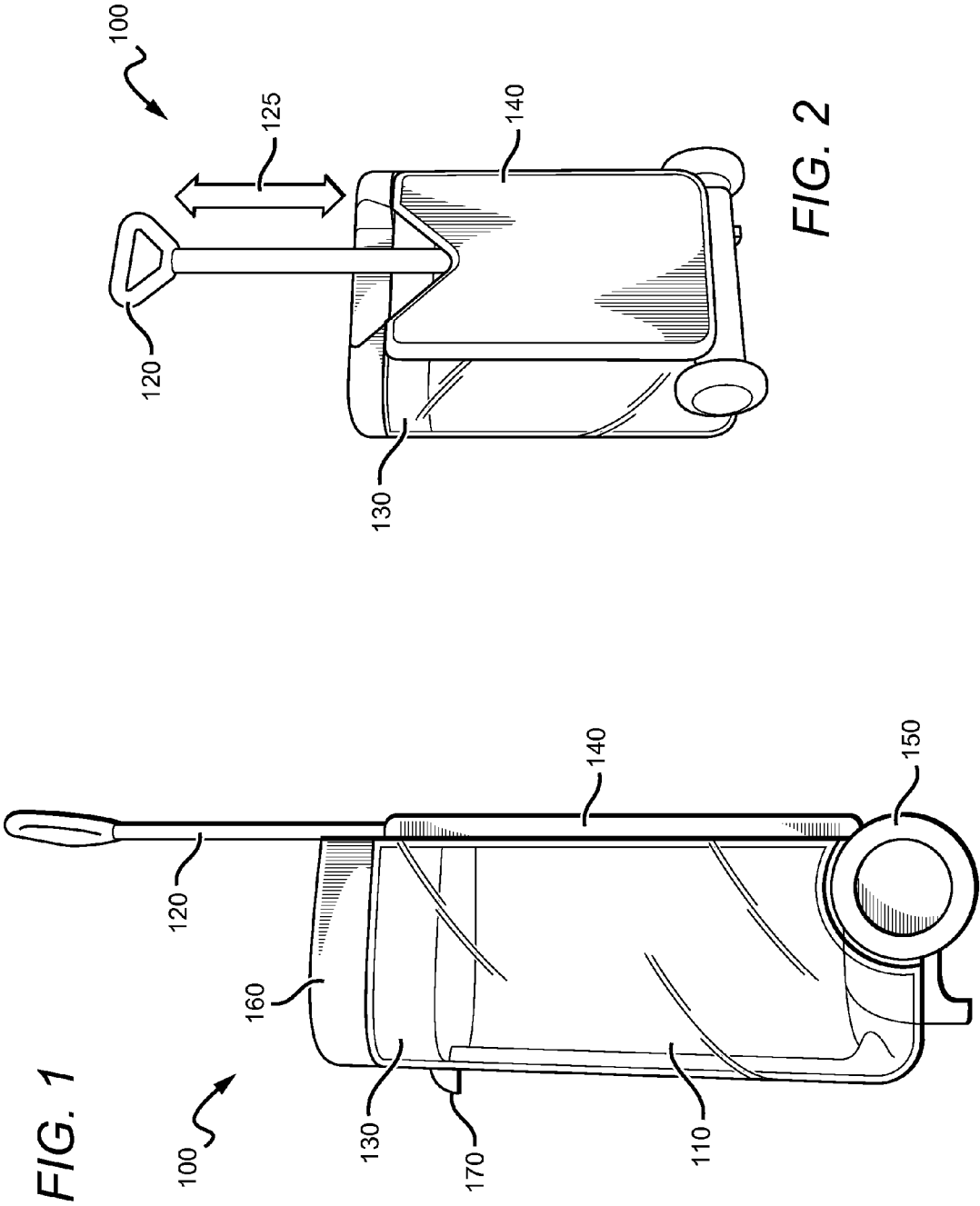

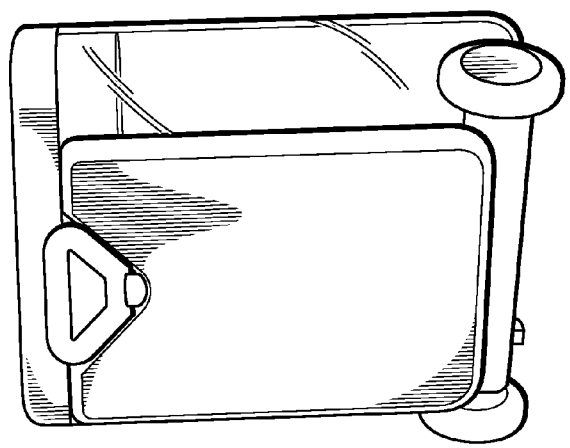
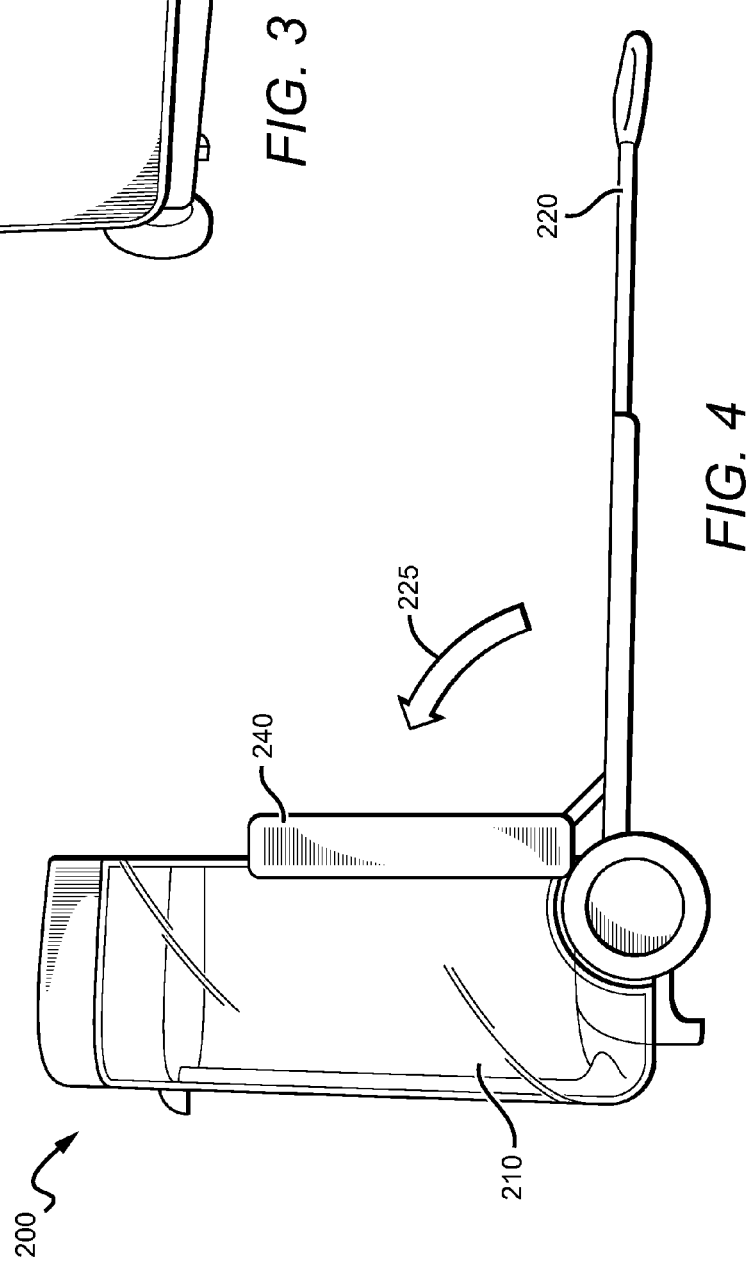

PORTABLE WATER CONTAINER WITH PUMP AND FILTER

This application claims the benefit of priority to U.S. provisional application Ser. No. 61/411,302 filed on Nov. 8, 2010 and U.S. provisional application Ser. No. 61/447,336 filed on Feb. 28, 2011, which are incorporated herein by reference.

FIELD OF THE INVENTION

The field of the invention is containers, and more specifically portable water filter containers.

BACKGROUND

Portably water coolers and containers are well known in the art, and generally consist of a container having a lumen suitable for holding water and other liquid beverages. The container can also be made of insulating material to maintain a desired temperature of the water, and can be configured with handles in order to facilitate transportation of the cooler. The Hydroller™, made by Reliance Products, LP (see http://www.relianceproducts.com/), is an 8 gallon portable water container having wheels and a handle. The Hydroller™ and other similar water containers advantageously provide a convenient way to transport large amounts of water during various activities, such as sporting events, picnics, and camp outs.

Drinking water quality has become a significant concern among consumers due to an increased understanding of how health issues relate to harmful water contaminants, such as bacteria, viruses, heavy metals, minerals, and chlorine. The Hydroller™ and similar products do not provide a pump and filtration system for purifying water. A large portable water container with a built-in filtration system is of particular value since it can provide healthy portable water for events involving large groups of people.

Various configurations of water bottles with filters are known in the art. For example, US Patent Application Publication No. 2010/0187183 to Nelson teaches a water bottle having a filter and a pump. The pump provides sufficient pressure to force water through the filter and out of the water bottle for drinking. While Nelson provides a convenient water bottle for delivering healthy water to a single individual, Nelson fails to provide a portable water-filtering container that can provide enough water for large groups of people.

This and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

International Patent Application Publication No. 2010/091920 to Naik teaches a portable hot beverage dispenser that street vendors can carry in a backpack. The dispenser has a pump that provides sufficient pressure to force a liquid through a filter and out of the dispenser. The dispenser also has a heating element for heating the liquid beverage. In this manner, a street vendor can sell hot beverages, such as coffee, made from clean filtered water. While Naik provides a useful portable dispenser for delivering filtered water beverages, the size of the dispenser in Naik is severely limited by the street vendor's strength and ability to carry the dispenser.

UK Patent Application No. GB2473256 to Pritchard discloses a 20 liter (5.28 US gallon) jerrycan with an internal brace configured to receive a wheel axle, allowing the container to be transported on wheels. The jerrycan also has an active carbon filter and a piston pump for forcing water through the filter and out of the tap. As such, Pritchard provides a portable water filter container for delivering significantly large amounts of filtered water. Unfortunately, the jerrycan in Pritchard is difficult to transport long distances due to the awkward manner a user must push or pull the container on wheels.

U.S. Pat. No. 5,154,317 to Roppolo also discloses a portable water filter container. Roppolo discloses attaching a 20 gallon water container with an electric pump and filter. The container sits on a hand truck, thus allowing for easy manual transportation of the container over long distances. Unfortunately, the container in Roppolo includes a high part count number and is overly complex and bulky.

Thus, while portable water containers having filtration systems are generally known, the current state of the art fails to provide a portable filter container that can be easily transported long distances in order to provide large quantities of filtered water. It has yet to be appreciated that a portable filter container can be simple, light-weight, and easy to transport over long distances.

Thus, there is still a need for improved portable water containers and filtration systems for delivering large quantities of filtered water.

SUMMARY OF THE INVENTION

The inventive subject matter provides apparatus, systems and methods in which a water container has a pump and filter. The pump is configured to provide pressure within the closed container such that water if forced through the filter system and dispensed from the container.

The container also has an extendible handle and wheels, to allow for easy transportation. The handle is also configured to actuate the pump. In one embodiment the pump is actuated by repeatedly pulling the handle upward and pushing it downward (e.g., a piston pump actuator). In another embodiment the pump is actuated by rotating the handle from a substantially vertical position to a substantially horizontal position (e.g., a lever pump actuator).

The container also includes a spout for dispensing the water. The container cap preferably integrates the spout with the filtration system. In this manner, the filter can be quickly replaced by removing the cap.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWING

FIG. 1 is a side view of one embodiment of a portable filter container with an extendable/retractable handle pump actuator.

FIG. 2 is a back-perspective view of the container of FIG. 1, with the handle extended.

FIG. 3 is a back-perspective view of the container of FIG. 1, with the handle retracted.

FIG. 4 is another embodiment of a portable filter container with a rotating handle pump actuator.

DETAILED DESCRIPTION

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

FIG. 1 shows a portable liquid delivery system 100, having a container 110, handle 120, filter 130, and pump system 140. The container is sized and dimensioned to hold at least ten gallons of water, but other suitable sizes and dimensions are contemplated. Wheels 150 are coupled to container 110 to allow for easy transportation and portability of the water. Filter 130 is coupled to a cap 160, which can be removed from container 110 in order to fill container 110 with water. Cap 160 is sufficiently large to allow open access to the lumen of container 110. Filter 130 can be easily replaced and maintained since filter 130 is located at the top of container 110 and can be quickly removed from container 110. However, those of skill in the art will appreciate that filter 130 could optionally be directly coupled to container 110 and could be located at the bottom of container 110 or along the sides.

Filter 130 is configured to remove impurities from the water, for example, via a physical barrier (i.e., membrane) and/or chemical absorption. Numerous filtration systems are well known and all systems suitable for improving water quality are contemplated. In preferred embodiments, the filter is configured to remove constituents having a particle size as small as 0.01 μm. Ceramic filters and carbon filters (e.g., powdered block filters, granular activated filters, activated carbon filters) are specifically contemplated, however any commercially available filter suitable for removing impurities from water can be used in accordance with the inventive concepts taught herein. Some examples of impurities include, but are not limited to, bacterial, protozoa, microbial cysts, viruses, heavy metals, minerals, and chlorine. The filter can be configured to remove different size particles and can be configured with multiple stages targeting different sized particles. Container 110 can additionally include other water treatment devices and processes, such as reverse osmosis systems, distillation systems, ultraviolet light purification, magnetic de scaling systems, energetic water treatment systems, infrared systems, catalytic conversion systems, ionizers, kinetic degradation fluxion treatment systems, and sediment filters.

After container 110 has been filled with water and cap 160 has been secured to container 110, handle 120 can be pulled up and pushed down repeatedly to actuate pump 140, as shown by actuator motion 125 in FIG. 2, thus dispensing the liquid through spout 170. FIG. 2 shows handle 120 in an extended (upward) position while FIG. 3 shows handle 120 in a retracted (downward) position.

Handle 120 also allows for easy transportation of system 100 by extending upward and rotating container 110 off the ground and onto wheels 150. In this manner, system 100 can be manually pushed or pulled over long distances, similar to a hand truck. The dual functionality of handle 120 reduces part count and total weight of the system, and also simplifies the overall design of system 100. Handle 120 is configured with sufficient strength to support the weight of the container filled with a liquid during transportation. Handle 120 also has sufficient strength to provide a means for actuating pump system 140.

Pump system 140 can be any system or device suitable for providing a pressure large enough to move a fluid through filtration system 130. Various pump configurations are known, for example: (i) positive displacement pumps (either with a rotary or reciprocating actuator) including gear pumps, progressing cavity pumps, roots-type pumps, peristaltic pumps, and compressed-air-powered double-diaphragm pumps; (ii) impulse pumps, including hydraulic ram pumps; (iii) velocity pumps, including centrifugal pumps, radial flow pumps, axial flow pumps, mixed flow pumps, educator-jet pumps; (iv) gravity pumps; (v) steam pumps; and (vi) valveless pumps. The above examples are not an exclusive list of all possible pump configurations and are provided merely as non-limiting examples. In preferred embodiments pump system 140 comprises a hand-operated reciprocating positive displacement pump. A simple and lightweight manual pump facilitates transportability of system 100.

Wheels 150 are included in system 100 in order to provide a means for easily transporting container 110. Those of skill in the art will appreciate that wheels 150 could optionally be replaced with runners, rollers, stationary or rotating spheres, caterpillar tracks, or any other configuration suitable for decreasing friction between the container and the ground. The exact configuration of the wheel-equivalent component will depend on the size and shape of container 110, the terrain, and the overall configuration of the portable liquid delivery system. System 100 is not intended to be limited to the exact configuration of wheels 150 as shown in FIG. 1.

Container 110 is made of a transparent plastic. While translucency advantageously allows the liquid to be visible to all users, alternative embodiments of container 110 could include completely opaque material. Container 110 can be made of any material suitable for holding water and other liquids and/or beverages, such as coffee, hot chocolate, soda, juices, milk, and beer. Common materials for water containers include, but are not limited to, copolyester, high-density polyethylene (HDPE), low-density polyethylene (LDPE), stainless steel, aluminum, and polypropylene. Polycarbonate has also been widely used but health concerns about chemical bishpenol A (BPA) have led to a decrease in polycarbonate water containers. The material of the container is preferably selected to optimize lightweight and high rigidity, although the exact material is not considered to be a limiting aspect of the inventive concepts taught herein. The material of container 110 can also be configured to provide insulation in order to keep the liquid hot or cold, depending on the application. The dimensions and overall shape of the container is preferably selected to optimize volumetric capacity and ease of portability. However, the exact size, dimension, and shape of the container is not considered to be a limiting aspect of the inventive concepts. The container is preferably sized to contain at least five gallons of water, more preferably at least eight gallons, most preferably at least ten gallons. Container 110 could also include marks for indicating the amount of liquid remaining (e.g., marks at every gallon).

FIG. 4 shows a portable liquid delivery system 200 having a handle 220 hingeably connected to a container 210. Unlike handle 120 of system 100, handle 220 is coupled to a pump system 240 such that handle 220 actuates pump 240 by rotating handle 220 downward and upward, as shown by actuator motion 225. FIG. 4 shows handle 220 in a substantially downward and horizontal position. Thus, while handle 220 still extends upward to facilitate transporting system 200, handle 220 uses the advantage of a lever system to pressurize container 210 at a greater pressure-per-force ratio than a piston pump. In addition, pump system 240 can be further actuated by extending and contracting handle 220 in a piston motion, similar to system 100. In this manner, system 200 includes two different motions for actuating pump system 240. As such, a user may choose whether to actuate the pump using (i) a piston motion (which provides a 1:1 pressure-per-force ratio) or (ii) a lever motion (which provides a mechanical advantage and a pressure-per-force ratio greater than 1:1).

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A portable liquid delivery system comprising:
   a container defining a lumen suitable for holding a liquid;
   a first opening coupled to the container and configured to mate with a cap;
   a first and second wheel coupled to the container;
   a filter coupled to the container and configured to remove constituents from the liquid;
   a pump coupled to the container;
   an extendible handle coupled to the container and configured to (i) actuate the pump and (ii) provide a means for transporting the container; and
   wherein the handle is configured to actuate the pump by pulling the handle upward and pushing the handle downward.

2. The portable liquid delivery system of claim 1, wherein the cap includes a spout suitable for dispensing the liquid.

3. The portable liquid delivery system of claim 1, wherein the lumen is sized and dimensioned to hold at least ten gallons of the liquid.

4. The portable liquid delivery system of claim 1, wherein the filter is selected from the group consisting of a granular-activated carbon filter, metallic alloy filter, microporous ceramic filter, carbon block resin membrane filter, and an ultrafiltration membrane filter.

5. The portable liquid delivery system of claim 1, wherein the filter is configured to remove constituents having a particle size of .01 µm.

6. The portable liquid delivery system of claim 1, wherein the handle is configured to actuate the pump using at least two distinct motions.

7. The portable liquid delivery system of claim 1, wherein the liquid is water.

8. A portable liquid delivery system comprising:
   a container defining a lumen suitable for holding a liquid;
   a first opening coupled to the container and configured to mate with a cap;
   a first and second wheel coupled to the container;
   a filter coupled to the container and configured to remove constituents from the liquid;
   a pump coupled to the container;
   an extendible handle coupled to the container and configured to (i) actuate the pump and (ii) provide a means for transporting the container; and
   wherein the handle is hingeably coupled to the container and configured to actuate the pump by rotating the handle downward to a horizontal position and rotating the handle upward to a vertical position.

9. The portable liquid delivery system of claim 8, wherein the filter is removable from the container.

10. The portable liquid delivery system of claim 8, wherein the handle has sufficient strength to support the weight of the container when filled with the liquid.

11. The portable liquid delivery system of claim 8, wherein the pump is a positive displacement pump selected from the group consisting of a gear pump, progressing cavity pump, roots-type pump, peristaltic pump, and compressed-air-powered double-diaphragm pump.

12. The portable liquid delivery system of claim 11, wherein the positive displacement pump has one of a rotary actuator and a reciprocating actuator.

13. The portable liquid delivery system of claim 8, wherein the pump is a hand-operated reciprocating positive displacement pump.

14. The portable liquid delivery system of claim 8, wherein the container is made of a transparent plastic.

15. The portable liquid delivery system of claim 8, wherein the liquid is a beverage selected from the group consisting of water, coffee, hot chocolate, soda, juice, milk, and beer.

16. The portable liquid delivery system of claim 8, wherein the container is configured to provide insulation.

17. The portable liquid delivery system of claim 8, wherein the handle is further configured to actuate the pump by extending and contracting the handle in a piston motion.

* * * * *